(12) United States Patent
Matono

(10) Patent No.: US 7,525,770 B2
(45) Date of Patent: Apr. 28, 2009

(54) THIN FILM MAGNETIC HEAD AND METHOD OF MANUFACTURING SAME

(75) Inventor: Naoto Matono, Saku (JP)

(73) Assignee: SAE Magnetics (H.K.) Ltd., Shatin, N.T. (HK)

( * ) Notice: Subject to any disclaimer, the term of this patent is extended or adjusted under 35 U.S.C. 154(b) by 0 days.

(21) Appl. No.: 10/175,962

(22) Filed: Jun. 19, 2002

(65) Prior Publication Data

US 2003/0030940 A1 Feb. 13, 2003

(30) Foreign Application Priority Data

Jun. 20, 2001 (JP) ............................. 2001-186521

(51) Int. Cl.
*G11B 5/127* (2006.01)
(52) U.S. Cl. ..................................... 360/317
(58) Field of Classification Search ................ 360/317, 360/126; 216/22; 29/603.14
See application file for complete search history.

(56) References Cited

U.S. PATENT DOCUMENTS

| 6,524,491 B1 * | 2/2003 | Liu et al. ..................... 216/22 |
| 6,553,649 B1 * | 4/2003 | Santini ..................... 29/603.14 |
| 6,560,076 B1 * | 5/2003 | Yazawa et al. ............... 360/317 |
| 6,621,660 B2 * | 9/2003 | Hsiao et al. .................. 360/126 |
| 6,704,162 B2 * | 3/2004 | Sato et al. .................... 360/126 |
| 2001/0000446 A1 * | 4/2001 | Mino .......................... 360/317 |
| 2002/0008936 A1 * | 1/2002 | Kawasaki et al. ............ 360/126 |

\* cited by examiner

*Primary Examiner*—Tianjie Chen
(74) *Attorney, Agent, or Firm*—Kenyon & Kenyon LLP

(57) ABSTRACT

A thin film magnetic head capable of shortening a manufacturing time and a method of manufacturing the same are provided. After forming a write gap layer by using a non-magnetic conductive material such as copper, a top pole is formed on the write gap layer by growing a plating film with the write gap layer used as a seed layer. Unlike the case where the write gap layer is formed by using a non-magnetic insulating material such as alumina, a step of newly forming a seed layer aside from the write gap layer and a step of selectively removing the newly formed seed layer become unnecessary. Therefore, the number of manufacturing processes is reduced, and the manufacturing time of the thin film magnetic head is shortened.

16 Claims, 15 Drawing Sheets

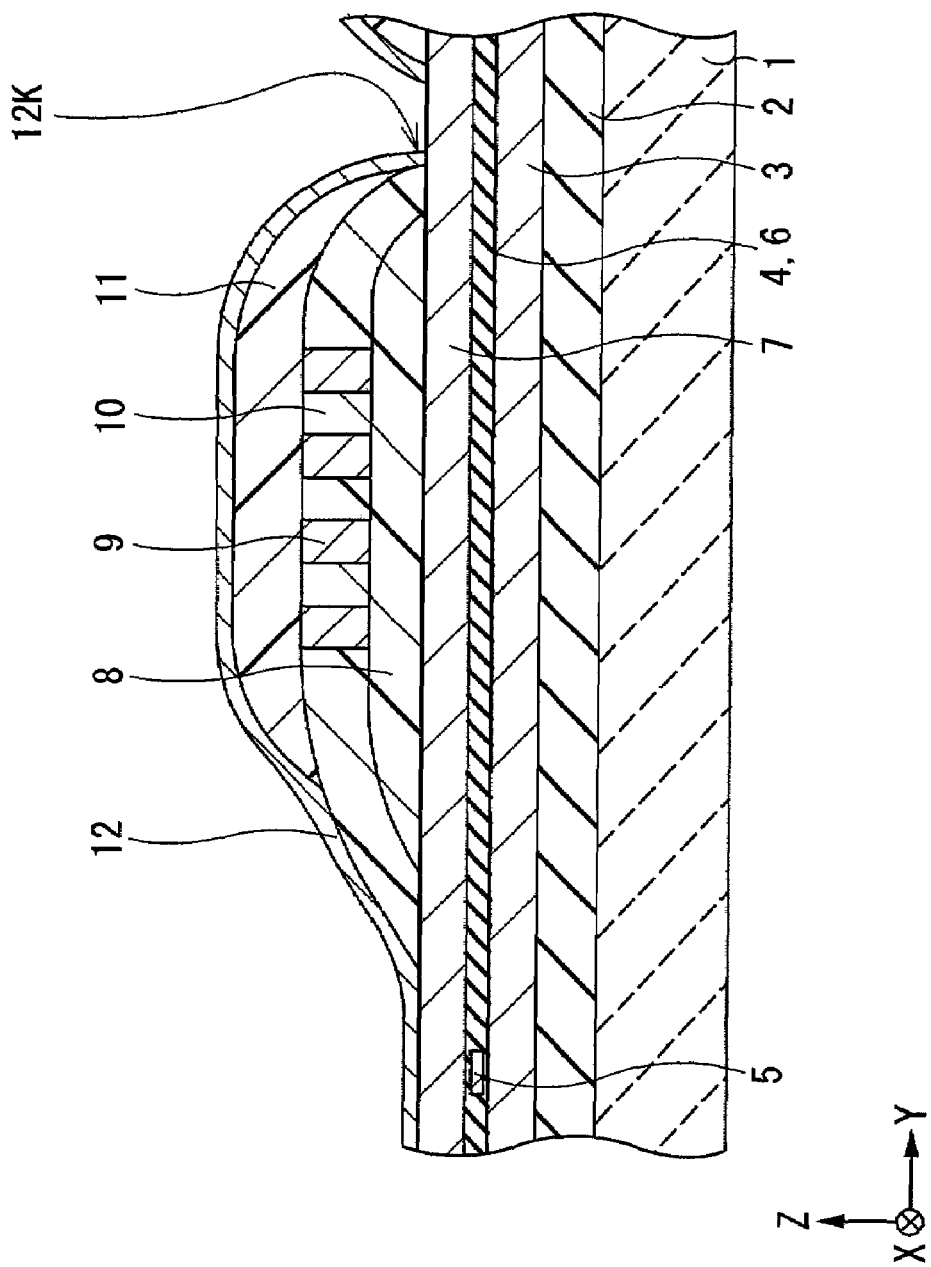

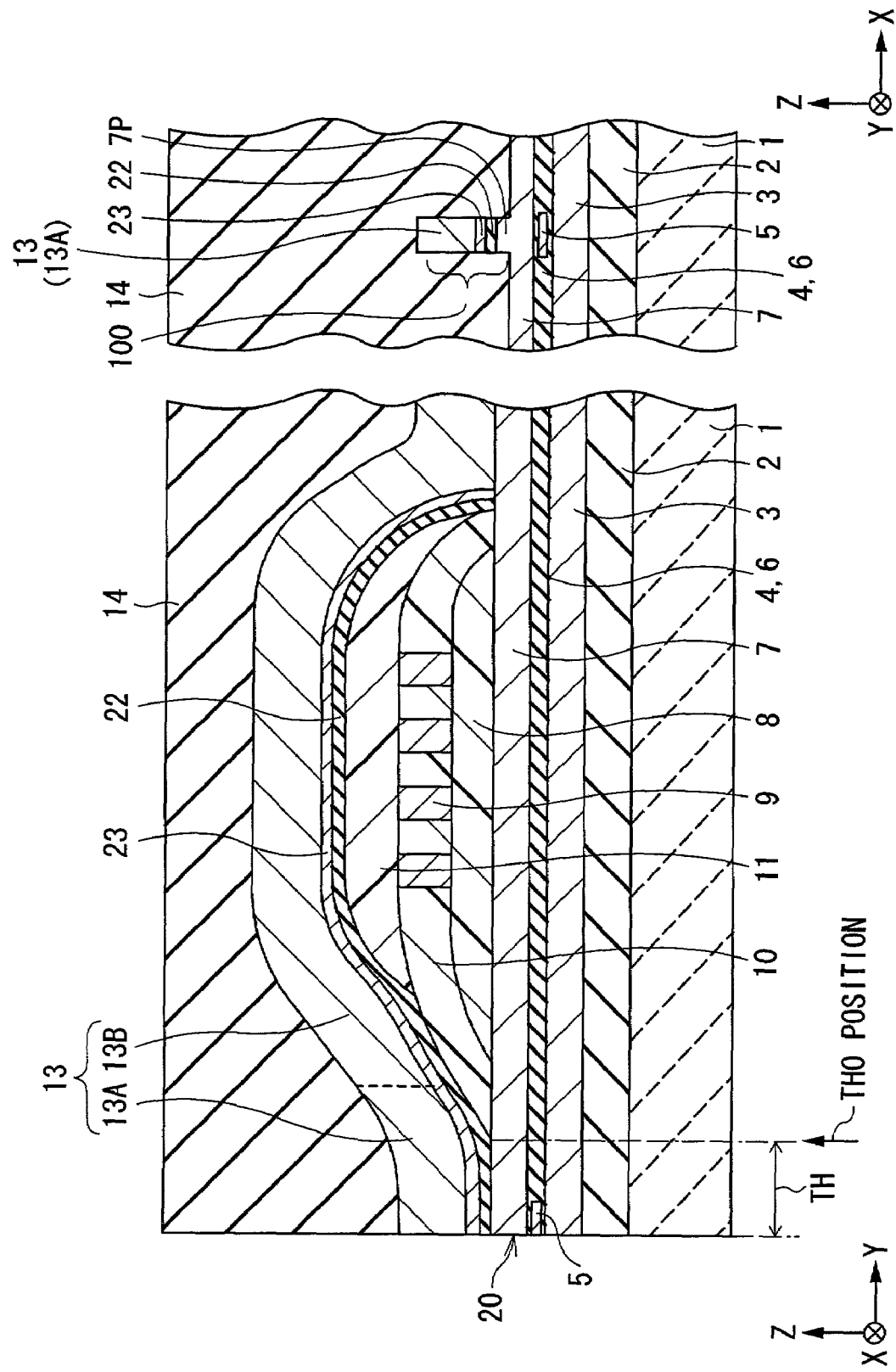

THIN FILM MAGNETIC HEAD AND METHOD OF MANUFACTURING SAME

BACKGROUND OF THE INVENTION

1. Field of the Invention

The present invention relates to a thin film magnetic head having an inductive magnetic transducer for writing and a method of manufacturing the same.

2. Description of the Related Art

In recent years, an improvement in performance of a thin film magnetic head is demanded in accordance with an increase in areal density of a hard disk drive. As a thin film magnetic head, for example, a composite thin film magnetic head in which a recording head having an inductive magnetic transducer for writing and a reproducing head having a magnetoresistive (hereinbelow, referred to as MR) element for reading are laminated is widely used.

The recording head, for example, comprises: a top pole and a bottom pole which are disposed on the top of, and on the bottom of a write gap, respectively, while sandwiching the write gap made of a non-magnetic insulating material such as aluminum oxide ($Al_2O_3$; hereinbelow, simply called "alumina"); a coil for generating the magnetic flux which is disposed in a space between the top pole and the bottom pole; and an insulating layer for embedding the coil in the space between the top pole and the bottom pole. Each of the top pole and the bottom pole has a uniform width which is almost the same as each other in the vicinity of the write gap in a region on a side close to a recording medium facing surface (air bearing surface) facing a magnetic recording medium (hereinbelow, simply called "recording medium"), thereby a trim structure which specifies a recording track width is constructed. For example, after forming the top pole including a portion (hereinbelow, simply called "uniform width portion") having the uniform width for defining the recording track width of the recording medium, by using the uniform width portion as a mask, the write gap and the bottom pole are etched in a self-aligned manner, and thereby the trim structure is formed.

Incidentally, in recent years, some requests for improvements are made with respect to manufacturability and performance of the thin film magnetic head. As a request from the viewpoint of manufacturability, for example, it can be provided to simplify manufacturing processes so as to shorten manufacturing time. Additionally, as a request from the viewpoint of performance, for example, it can be provided to extremely micrify the width of the trim structure (pole width) to the order of submicrons (for example, no more than about 0.5 µm) so as to increase the track density of the recording medium in order to achieve high recording density.

However, conventionally, there are problems that it is difficult to shorten the manufacturing time because a lot of manufacturing processes are necessary for manufacturing the thin film magnetic head, and that it is difficult to extremely micrify the pole width with high precision because processing accuracy is not sufficient at the time of etching the write gap layer and the bottom pole in a self-aligned manner.

SUMMARY OF THE INVENTION

The invention has been achieved in consideration of the problems. It is a first object of the invention to provide a thin film magnetic head capable of shortening the manufacturing time and a method of manufacturing the same.

Furthermore, it is a second object of the invention to provide a thin film magnetic head capable of extremely micrifying the pole width with high precision and a method of manufacturing the same.

A thin film magnetic head of the invention includes: first and second magnetic layers magnetically coupled to each other and having first and second pole tip portions placed so as to face a recording medium in conjunction with being in contact with a gap layer and being opposed to each other as sandwiching the gap layer; a thin film coil disposed in a space between the first and second magnetic layers; and an insulating layer embedding the thin film coil in the space between the first and second magnetic layers. At least the first pole tip portion is made of a plating film, and the gap layer is constructed of a non-magnetic conductive material.

A method of manufacturing a thin film magnetic head of the invention is a method of manufacturing a thin film magnetic head including: first and second magnetic layers magnetically coupled to each other and having first and second pole tip portions placed so as to face a recording medium in conjunction with being in contact with a gap layer and being opposed to each other as sandwiching the gap layer; a thin film coil disposed in a space between the first and second magnetic layers; and an insulating layer embedding the thin film coil in the space between the first and second magnetic layers. The method includes: a step of forming the gap layer with a non-magnetic conductive material; and a step of selectively forming at least the first pole tip portion on the gap layer by growing a plating film with the gap layer used as an electrode.

In the thin film magnetic head of the invention or the method of manufacturing the same, after the gap layer is formed with the non-magnetic conductive material, at least the first pole tip portion is selectively formed on the gap layer by growing the plating film with the gap layer used as an electrode. Unlike the case where the gap layer is formed with a non-magnetic insulating material, a step of separately forming an electrode layer necessary for growing the plating film aside from the gap layer becomes unnecessary. Therefore, the number of the manufacturing processes is reduced.

In the method of manufacturing the thin film magnetic head of the invention, subsequently to selectively etching the gap layer through ion milling by using at least the first pole tip portion as a mask, the second magnetic layer may be selectively etched to a predetermined depth.

In the thin film magnetic head of the invention or the method of manufacturing the same, it is preferable that a material on which an etching speed through ion milling is within a range extending from being higher than 0.5 times to being no more than 2 times of an etching speed on the second magnetic layer is used as the non-magnetic conductive material. More specifically, one out of a group consisting of copper, chromium, tantalum, aluminum, gold, niobium, tungsten, ruthenium, molybdenum, beryllium, nickel copper, nickel chromium, nickel phosphorus and beryllium copper, or an alloy including at least the one out of the group can be used.

Furthermore, in the thin film magnetic head of the invention or the method of manufacturing the same, the first magnetic layer including the first pole tip portion may be formed of the plating film as a single layer.

Other and further objects, features and advantages of the invention will appear more fully from the following description.

BRIEF DESCRIPTION OF THE DRAWINGS

FIGS. 2A and 2B are cross sections for explaining a process subsequent to FIGS. 1A and 1B, respectively.

FIGS. 11A and 11B are cross sections showing a cross-sectional structure of a thin film magnetic head as a comparative example of the thin film magnetic head according to the embodiment of the invention.

DETAILED DESCRIPTION OF THE PREFERRED EMBODIMENTS

Figures 1A, 1B:
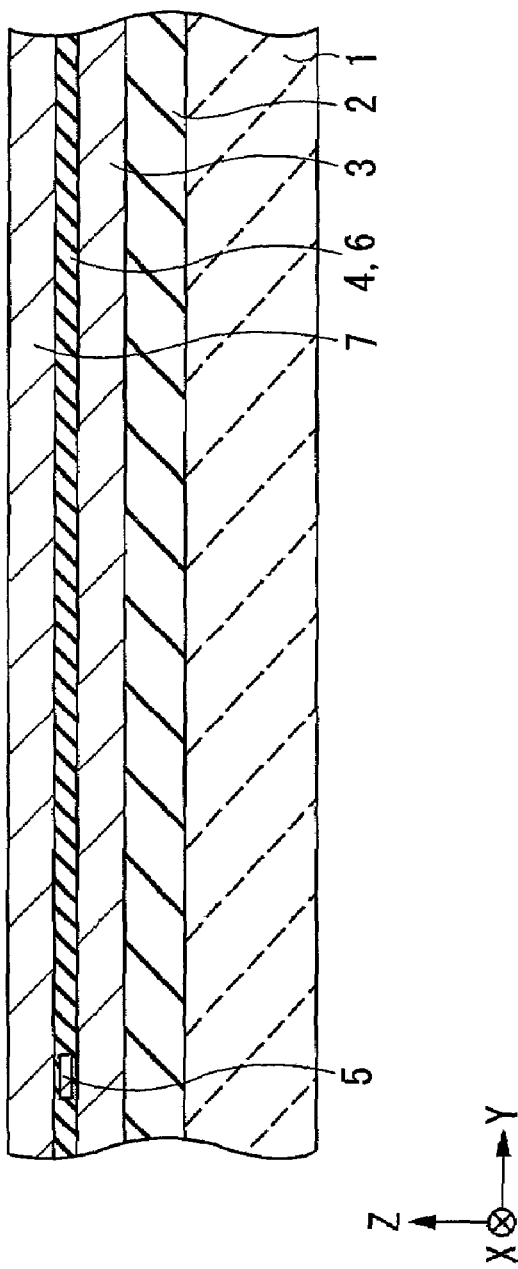
FIGS. 1A and 1B are cross sections for explaining a process in a method of manufacturing a thin film magnetic head according to an embodiment of the invention.

Hereinbelow, an embodiment of the invention will be described in detail by referring to the drawings.

<Method of Manufacturing Thin Film Magnetic Head>

Figure 7:
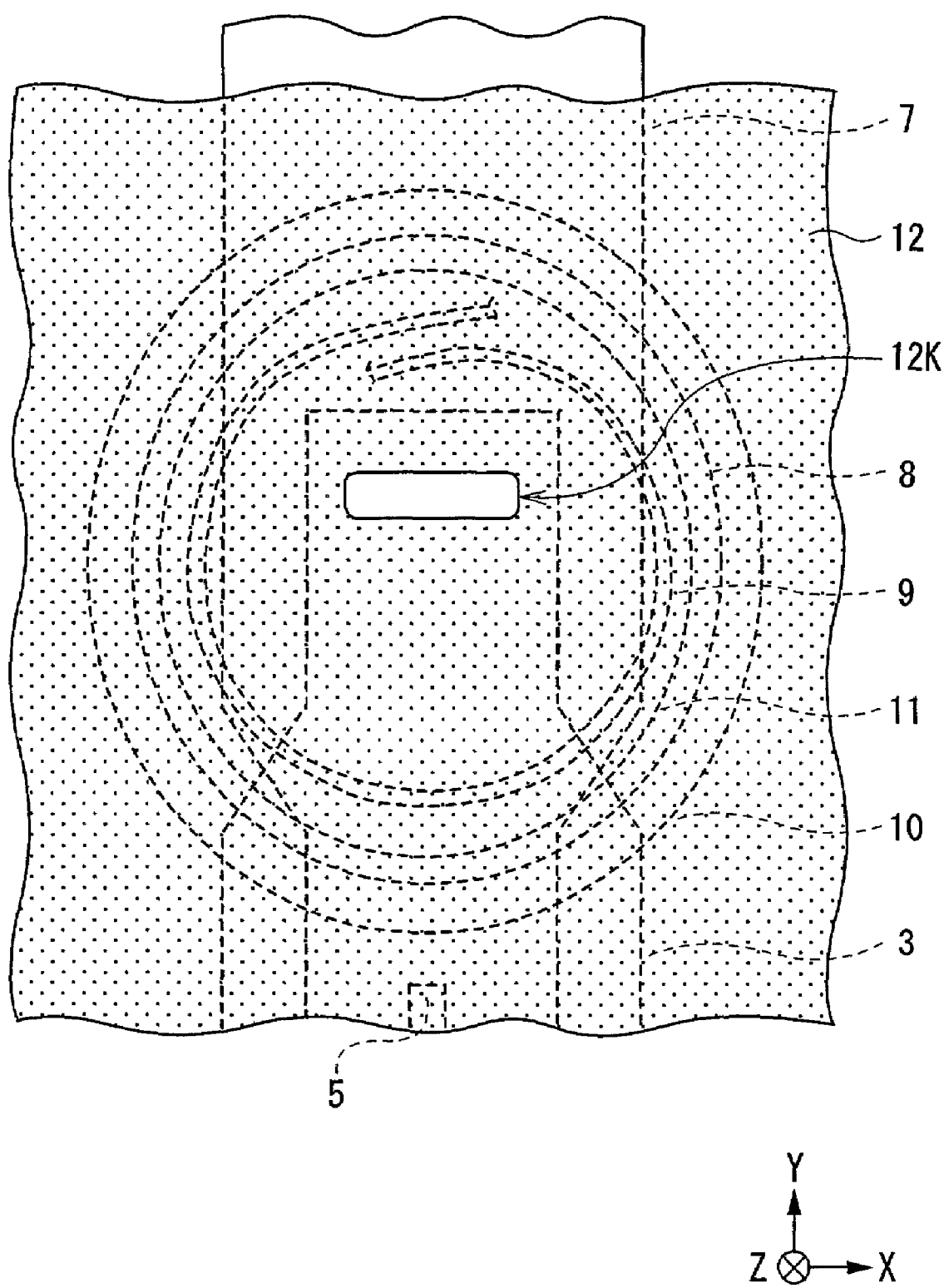
FIG. 7 is a plan view corresponding to the cross sections shown in FIGS. 2A and 2B.
Figure 8:
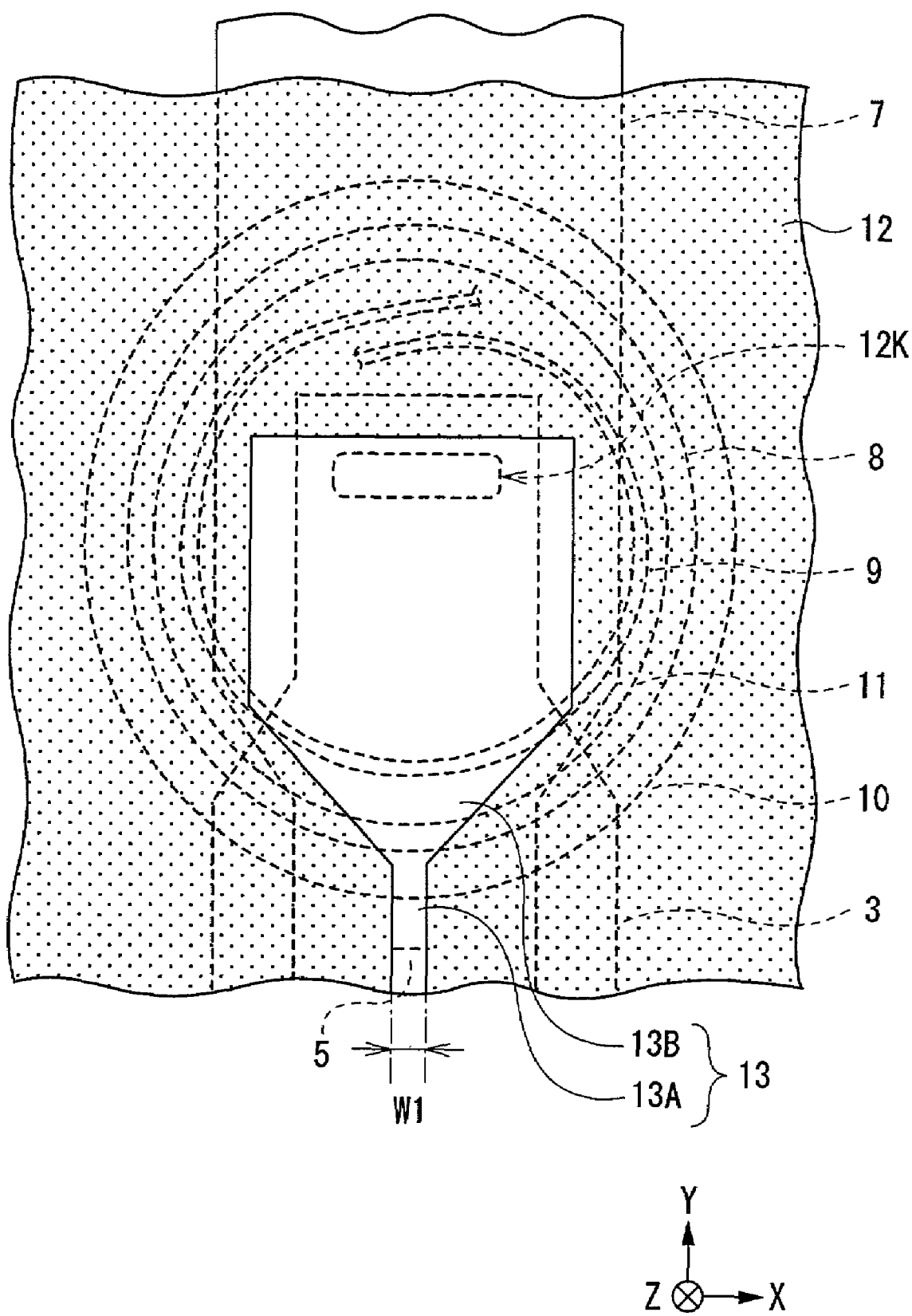
FIG. 8 is a plan view corresponding to the cross sections shown in FIGS. 3A and 3B.
Figure 9:
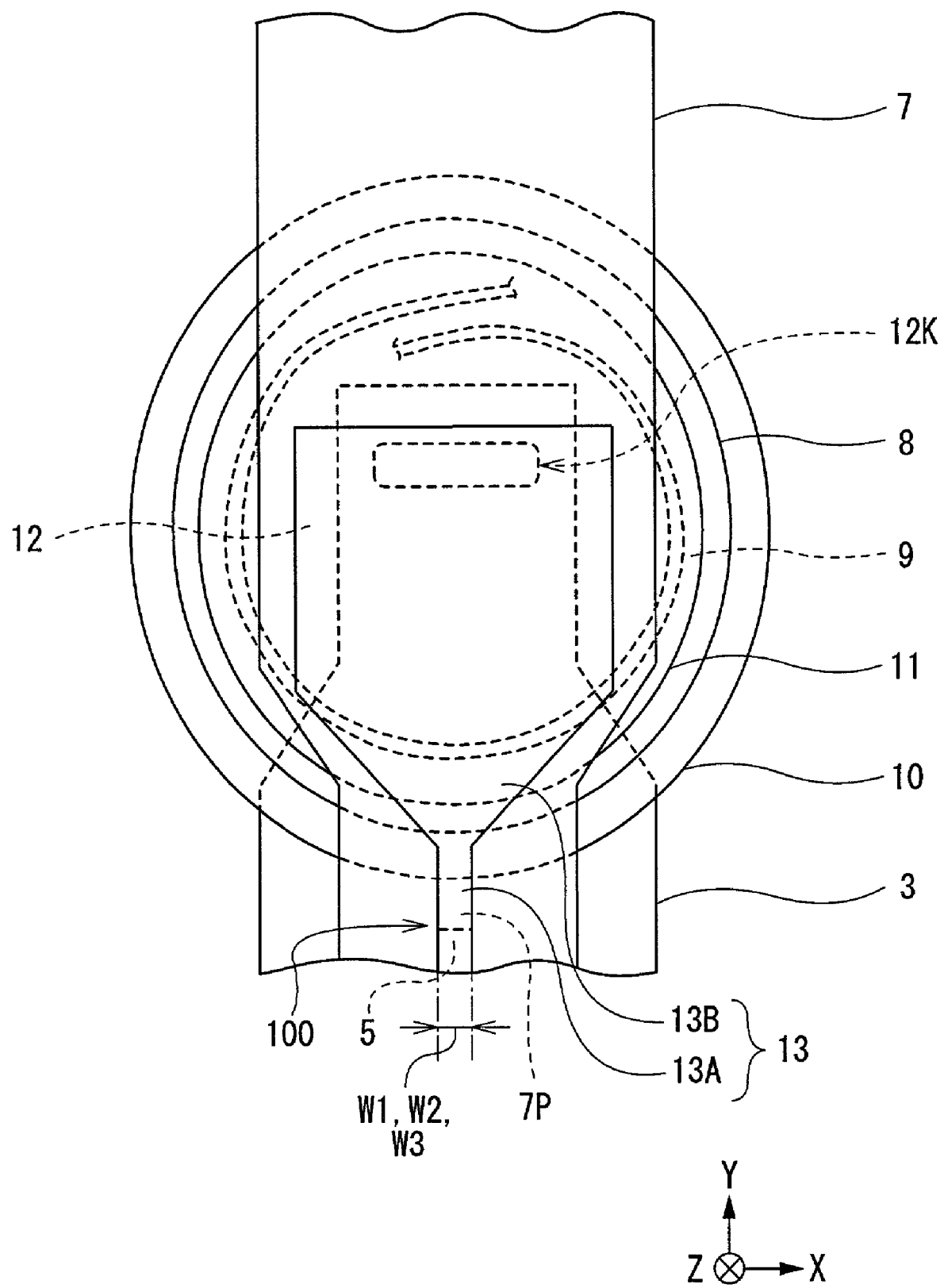
FIG. 9 is a plan view corresponding to the cross sections shown in FIGS. 4A and 4B.

First, referring to FIGS. 1A and 1B to FIGS. 6A and 6B, and FIGS. 7 to 9, a method of manufacturing a composite thin film magnetic head as "a method of manufacturing a thin film magnetic head" according to an embodiment of the invention will be described. Incidentally, since "a thin film magnetic head" of the invention is embodied by the method of manufacturing the thin film magnetic head according to the embodiment, the head will be also described hereinbelow. FIGS. 1A and 1B to FIGS. 6A and 6B show the method of manufacturing the thin film magnetic head. In each pair of drawings, FIGS. 1A to 6A are cross sections each of which is perpendicular to the air bearing surface, and FIGS. 1B to 6B are cross sections each of which is parallel to the air bearing surface, respectively. FIGS. 7 to 9 show the plane structures corresponding to the cross-sectional structures shown in FIGS. 2A and 2B to FIGS. 4A and 4B, respectively. In FIGS. 7 to 9, only main parts are shown out of the constituents shown in FIGS. 2A and 2B to FIGS. 4A and 4B.

In the following description, the X axis direction in each of FIGS. 1A and 1B to FIGS. 6A and 6B and FIGS. 7 to 9 is described as "width", the Y axis direction is described as "length", and the Z axis direction is described as "thickness (or height)". The side in the Y axis direction which is close to an air bearing surface 20 (refer to FIG. 6A) or a side which becomes the air bearing surface 20 in a following process is described as "front side (or forward)", and the opposite side is described as "rear side (or rearward)". Furthermore, in the description of FIG. 10 and onward which will be described hereinafter, the X, Y and Z-axis directions are described in a similar manner.

Figure 10:
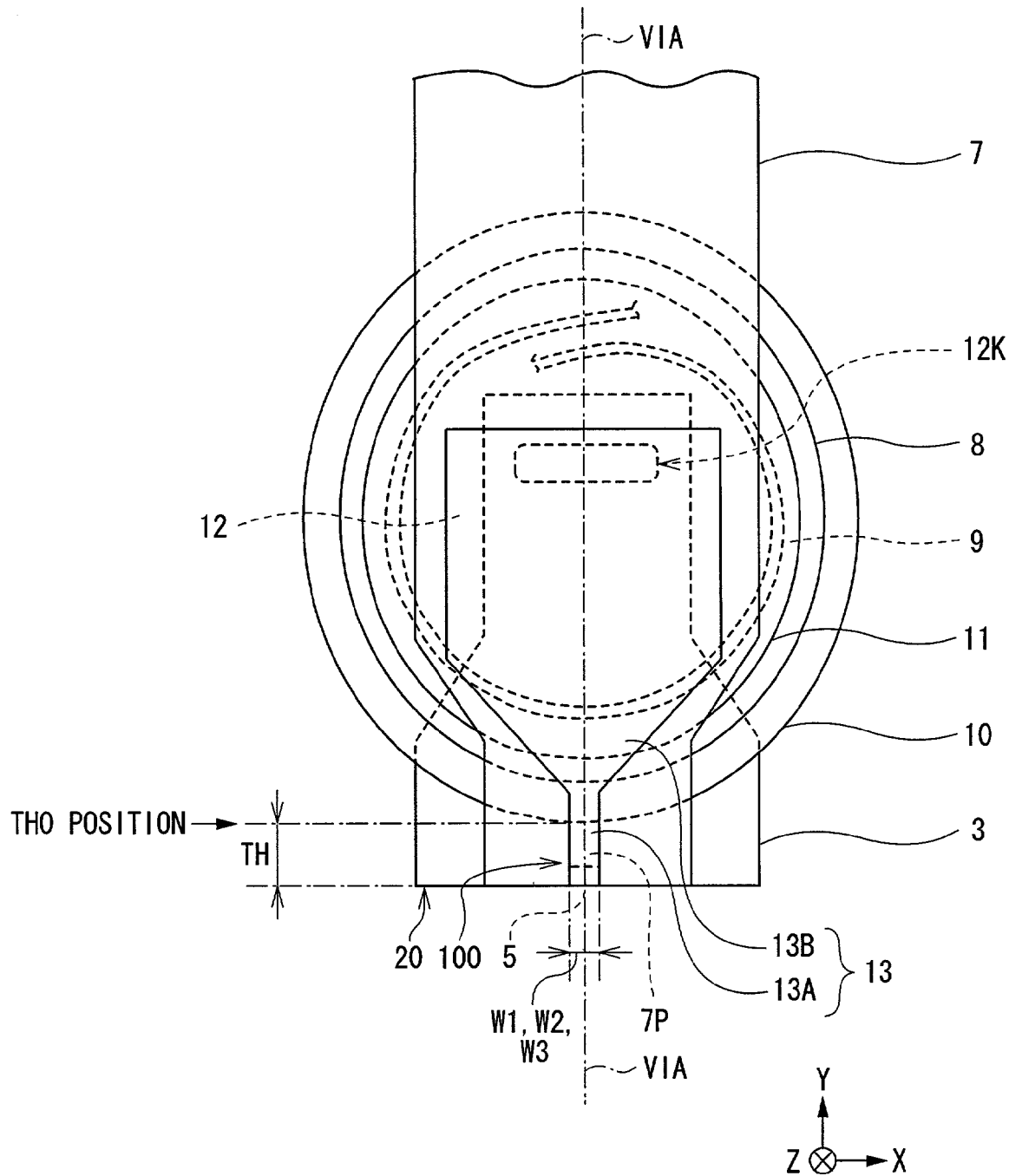
FIG. 10 is a plan view showing a plane structure of the thin film magnetic head according to the embodiment of the invention.

In the method of manufacturing the thin film magnetic head according to the embodiment, first of all, as shown in FIGS. 1A and 1B, on a substrate 1 made of altic ($Al_2O_3$ with TiC) or the like, an insulating layer 2 made of, for example, alumina is deposited in a thickness of about 3.0 μm to 5.0 μm. Subsequently, on the insulating layer 2, by using, for example, plating which will be described hereinafter, a bottom shield layer 3 made of nickel iron alloy (NiFe; hereinbelow, simply called "Permalloy (trade name)") or the like is selectively formed in a thickness of about 2.0 μm. At the time of forming the bottom shield layer 3, for example, the bottom shield layer 3 is made to have a shape in plane as shown in FIG. 10 which will be described hereinafter.

Subsequently, as shown in FIGS. 1A and 1B, on the bottom shield layer 3, a shield gap film 4 made of alumina or the like is formed in a thickness of about 0.01 μm to 0.1 μm by, for example, sputtering. Subsequently, on the shield gap film 4, an MR film 5 for constructing an MR device is formed so as to be in a desirably patterned shape by high-precision photolithography. Subsequently, by using a material and a forming method similar to those in the case where the shield gap film 4 is formed, a shield gap film 6 is formed so as to cover the MR film 5, and thereby the MR film 5 is buried in the shield gap films 4 and 6.

Subsequently, as shown in FIGS. 1A and 1B, on the shield gap film 6, for example, by using a forming method and a forming material similar to those in the case where the bottom shield layer 3 is formed, a bottom pole 7 is selectively formed in a thickness of about 2.0 μm to 3.0 μm. At the time of forming the bottom pole 7, for example, the bottom pole 7 is made to have a shape in plane as shown in FIG. 10 which will be described hereinafter. Here, the bottom pole 7 corresponds to an example of "second magnetic layer" in the invention.

Subsequently, on the bottom pole 7, by applying a material which is fluidized when being heated, for example, an organic insulating material such as photoresist, a photoresist film is selectively formed. Next, a heat treatment is conducted on the photoresist film at a temperature of about 200° C. to 250° C. By the heat treatment, as shown in FIGS. 2A and 2B and FIG. 7, an insulating layer 8 is selectively formed. The surface in the vicinity of the edge of the insulating layer 8 forms a slope which is rounded in accordance with the fluidity of photoresist at the time of the heat treatment. At the time of forming the insulating layer 8, the disposing region of the insulating layer 8 is made to correspond to a disposing region of a thin film coil 9 which will be described hereinafter.

Subsequently, as shown in FIGS. 2A and 2B and FIG. 7, on the insulating layer 8, the thin film coil 9 for an inductive recording head made of copper (Cu) or the like is selectively formed in a thickness of about 1.5 μm by, for example, electrolytic plating. At the time of forming the thin film coil 9, for example, the thin film coil 9 is made to have a winding structure in a spiral shape as shown in FIG. 7.

Subsequently, as shown in FIGS. 2A and 2B and FIG. 7, by a forming material and a forming method similar to those in the case where the insulating layer 8 is formed, an insulating layer 10 is selectively formed so as to cover the insulating layer 8, the thin film coil 9 and the peripheral region thereof. The spacing between each turns of the thin film coil 9 is filled up with the insulating layer 10 so as to bridge the gap. At the time of forming the insulating layer 10, for example, the insulating layer 10 is formed so that the top face of the thin film coil 9 is exposed.

Subsequently, as shown in FIGS. 2A and 2B and FIG. 7, by a forming material and a forming method similar to those in the case where the insulating layer 8 is formed, an insulating layer 11 is selectively formed on the insulating layer 10. At the time of forming the insulating layer 11, for example, the insulating layer 11 is formed so as to cover at least the thin film coil 9 and so that its front end recedes rearward of the front end of the insulating layer 10. The insulating layers 8, 10 and 11 electrically isolate the thin film coil 9 from its periphery. Here, a group of the insulating layers 8, 10 and 11 corresponds to an example of "insulating layer" in the invention.

Subsequently, as shown in FIGS. 2A and 2B and FIG. 7, by sputtering or the like, a write gap layer 12 is formed in a thickness of about 0.1 μm to 0.3 μm so as to cover the entire surface. At the time of forming the write gap layer 12, an opening 12K is formed for connecting the bottom pole 7 with a top pole 13 (refer to FIG. 3) which will be formed in a following process. As a forming material of the write gap layer 12, for example, a non-magnetic conductive material which has an ion milling speed E1 within the range from nearly half (exclusive) of an etching speed E2 on the bottom pole 7 to two times of the etching speed E2 ($0.5 \times E2 < E1 \leq 2.0 \times E2$) is used. More specifically, for example, one material out of a group composed of copper, chromium (Cr), tantalum (Ta), aluminum (Al), gold (Au), niobium (Nb), tungsten (W), ruthenium (Ru), molybdenum (Mo), beryllium (Be), nickel copper (NiCu), nickel chromium (NiCr), nickel phosphorus (NiP) and beryllium copper (BeCu), or an alloy including at least one material out of the group is used. Especially, it is more preferable that tantalum, ruthenium or the like, which has the ion milling speed E1 almost equal to the etching speed E2 ($E1 \approx E2$), is used as the forming material of the write gap layer 12. The write gap layer 12 functions as a gap in order to generate a signal magnetic flux for writing between the bottom pole 7 and the top pole 13, and functions as a seed layer (electrode) for forming the top pole 13 through plating in a following process. Here, the write gap layer 12 corresponds to an example of "gap layer" in the invention.

Subsequently, a photoresist is applied on the entire surface so as to form a photoresist film. After that, by patterning the photoresist film through a high-precision photolithography process, a framework (frame pattern; not shown in the drawings) for forming the top pole 13 is selectively formed.

Figures 3A, 3B:
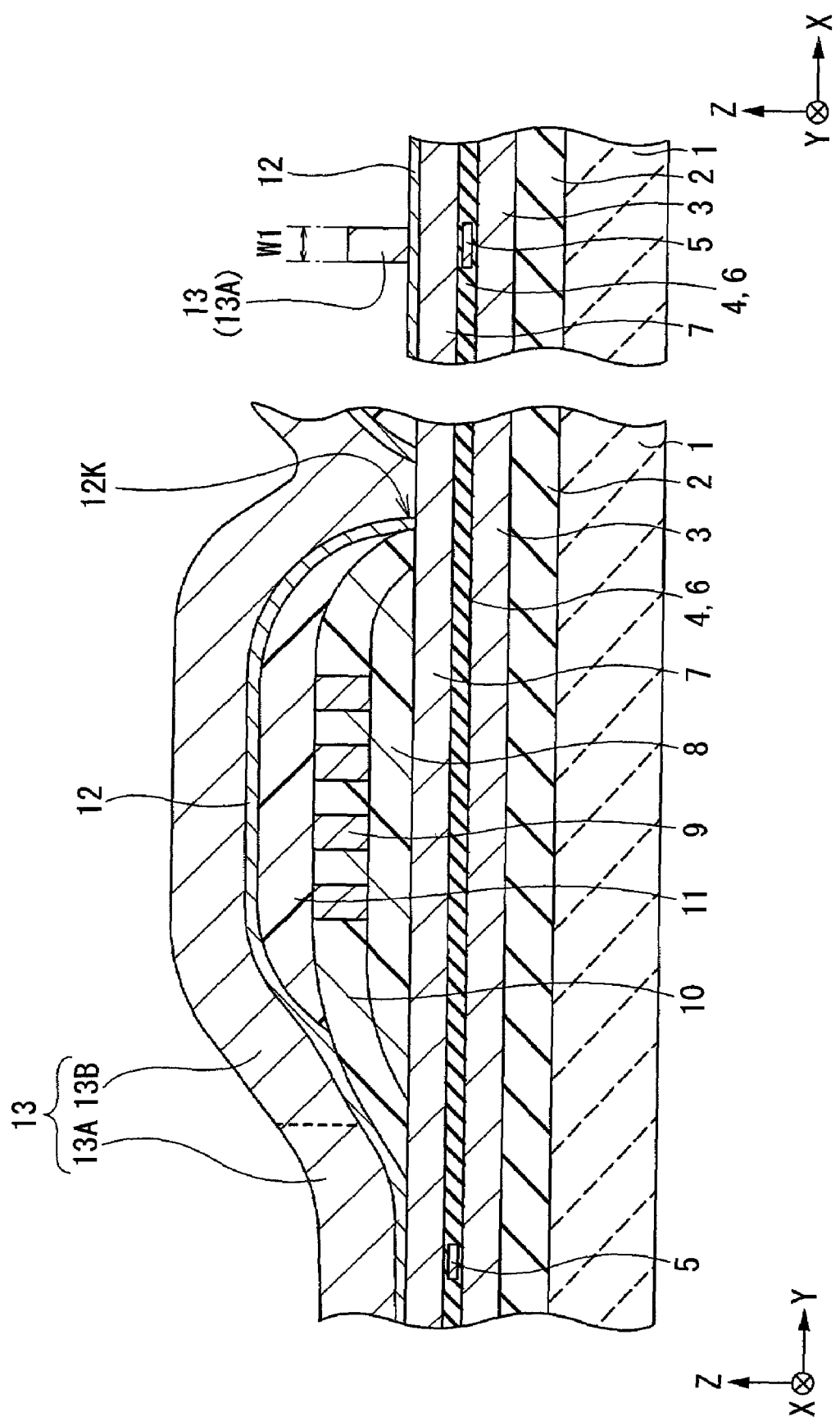
FIGS. 3A and 3B are cross sections for explaining a process subsequent to FIGS. 2A and 2B, respectively.

Subsequently, by using the frame pattern which is formed in the previous process, and by using the write gap layer 12 as the seed layer, a plating film is grown. Consequently, as shown in FIGS. 3A and 3B and FIG. 8, in a region extending from a side (left side in FIG. 3A, bottom side in FIG. 8) which will be the air bearing surface 20 in a following process to the opening 12K, the top pole 13 is selectively formed in a thickness of about 0.3 μm to 6.0 μm. The top pole 13 is made of a material having a high saturation magnetic flux density including nickel, cobalt (Co) or iron (Fe), for example, Permalloy, cobalt iron (CoFe), nickel cobalt iron (CoFeNi) or the like. At the time of forming the top pole 13, for example, as shown in FIG. 8, the top pole 13 is made to include a tip portion 13A and a yoke portion 13B in accordance with the order from the side which will be the air bearing surface 20 in the following process. The tip portion 13A has an extremely minute uniform width W1 (for example, $W1 \approx 0.3$ μm) for defining the recording track width, and the yoke portion 13B has a width wider than the width of the tip portion 13A. The structural characteristics of the top pole 13 will be described hereinafter. The top pole 13 is magnetically coupled to the bottom pole 7 in the opening 12K, so that a propagation path of the magnetic flux (magnetic path) is formed with the bottom pole 7 and the top pole 13. Here, the top pole 13 corresponds to an example of "first magnetic layer" in the invention and the tip portion 13A corresponds to an example of "first pole tip portion" in the invention.

Figures 4A, 4B:
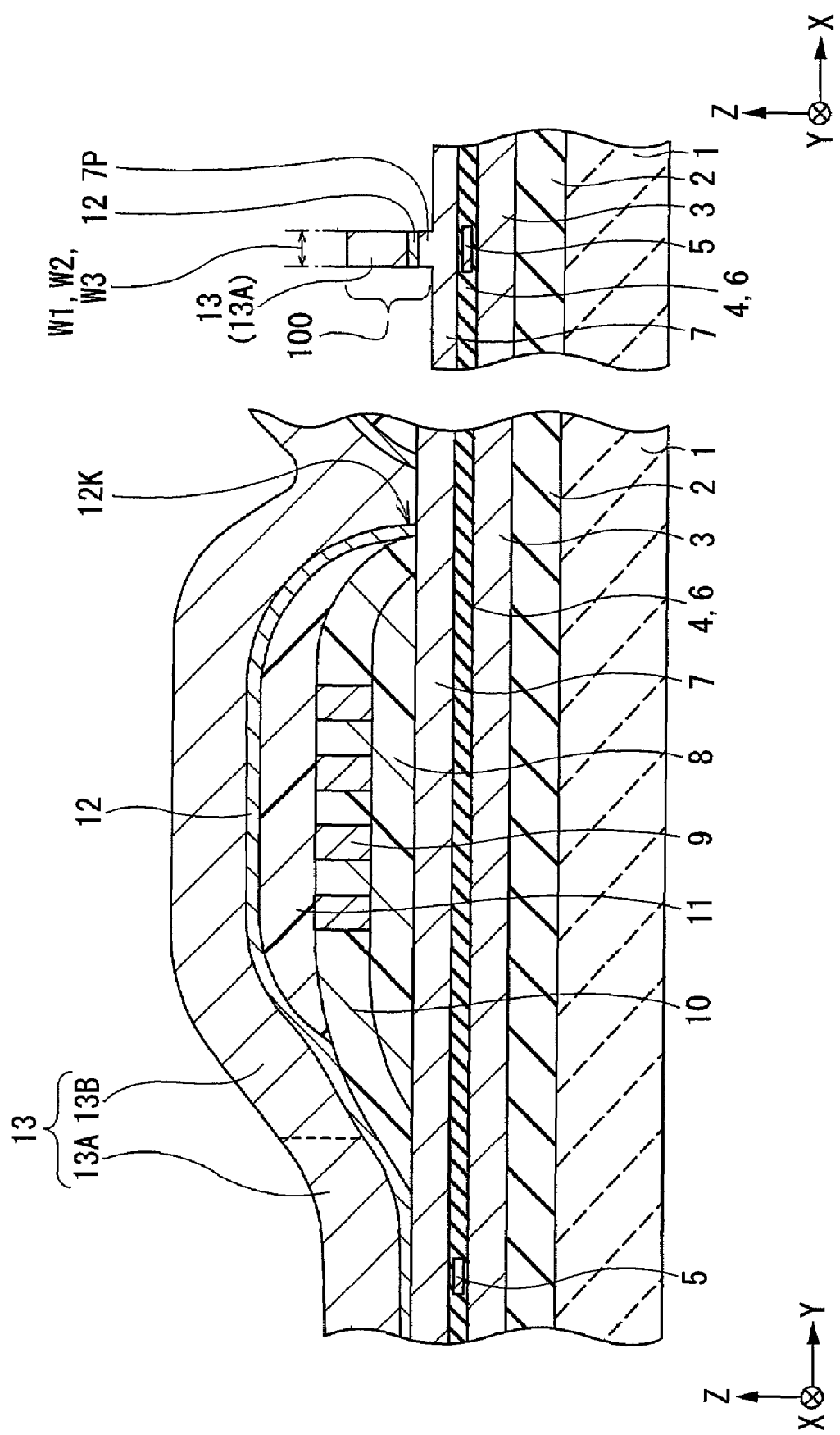
FIGS. 4A and 4B are cross sections for explaining a process subsequent to FIGS. 3A and 3B, respectively.

Subsequently, as shown in FIGS. 4A and 4B and FIG. 9, by using the top pole 13 as a mask, part of the write gap layer 12 is etched and removed except for the part corresponding to the disposing region of the top pole 13, through ion milling or the like.

Subsequently, following the etching process on the write gap layer 12, as shown in FIGS. 4A and 4B and FIG. 9, the bottom pole 7 and the like around the top pole 13 are etched and removed in a similar manner. At the time of etching the bottom pole 7 and the like, for example, the bottom pole 7 is dug down until a depth of etching reaches about 0.5 μm from the surface of the write gap layer 12. Thereby, a trim structure 100 is formed. The trim structure 100 is constituted of the tip portion 13A (width W1) in the top pole 13, a portion (portion 7P; width W2) corresponding to the tip portion 13A in the bottom pole 7 and a portion (width W3) sandwiched between the tip portion 13A and the portion 7P in the write gap layer 12. Each of these constituents has almost the same width as each other (W1=W2=W3). Here, the portion 7P corresponds to an example of "second pole tip portion" in the invention.

Figures 5A, 5B:
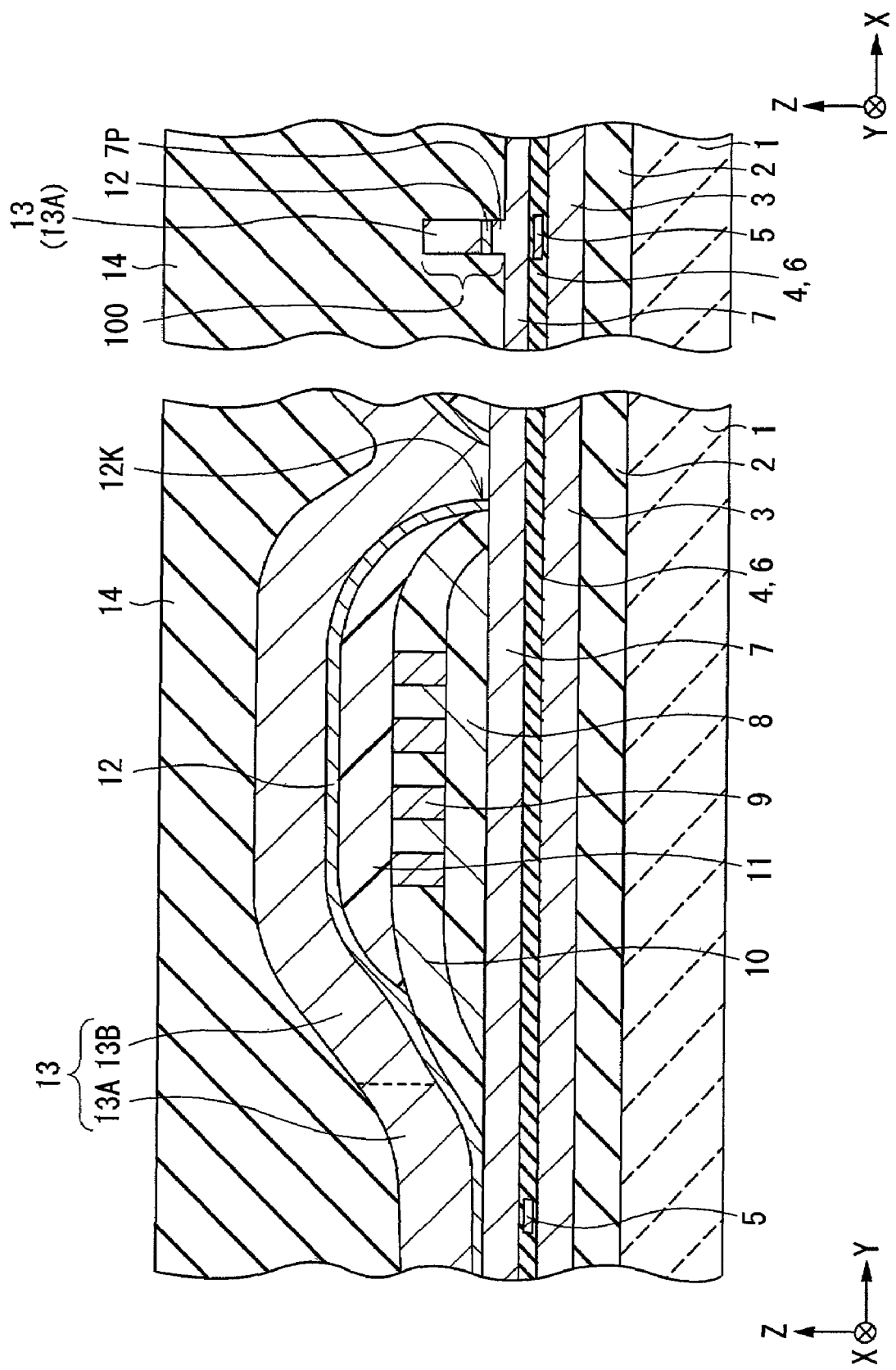
FIGS. 5A and 5B are cross sections for explaining a process subsequent to FIGS. 4A and 4B, respectively.

Subsequently, as shown in FIGS. 5A and 5B, an overcoat layer 14 made of an inorganic insulating material such as alumina or the like is formed in a thickness of about 20 μm to 40 μm so as to cover the entire surface.

Figures 6A, 6B:
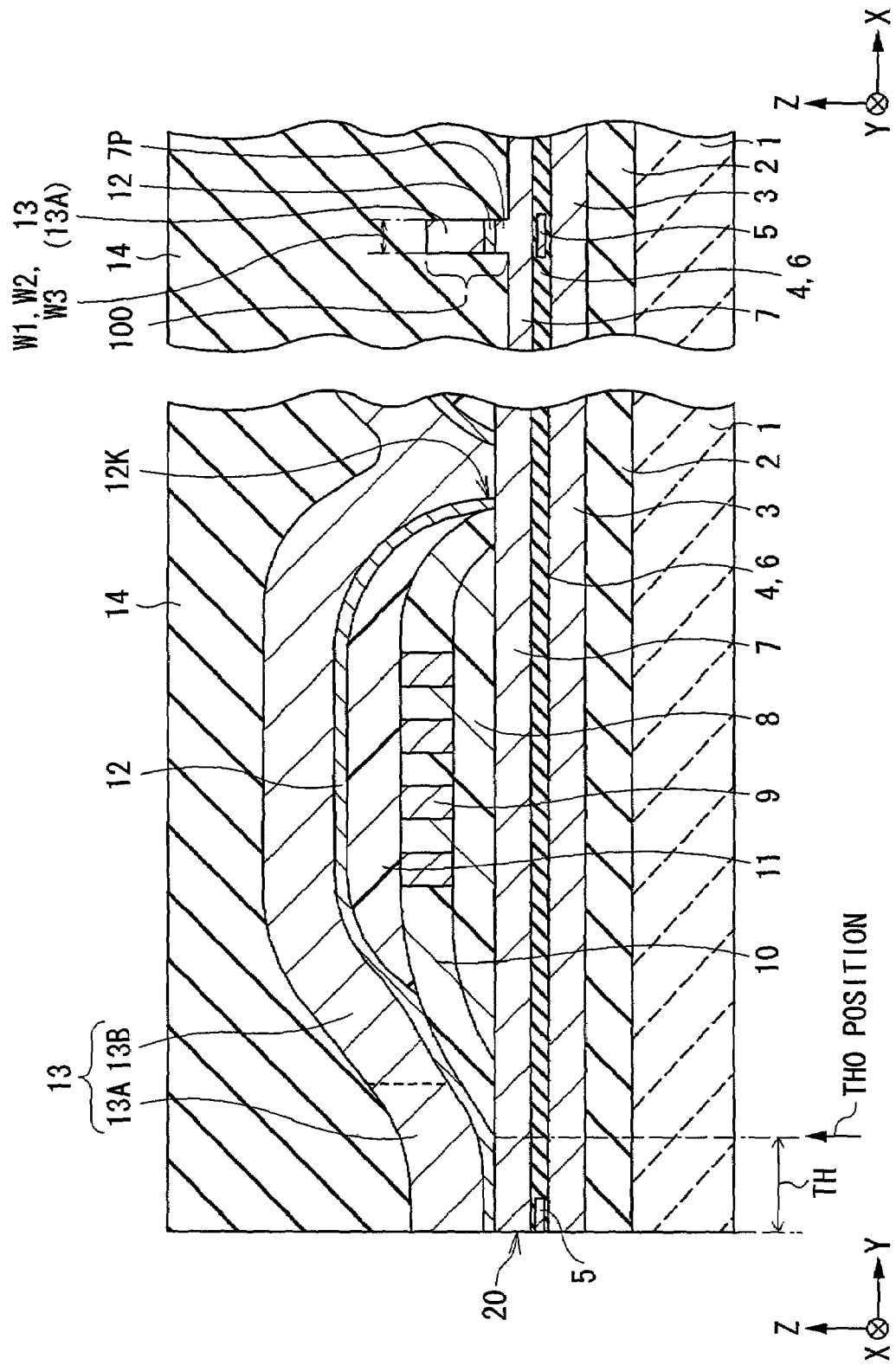
FIGS. 6A and 6B are cross sections for explaining a process subsequent to FIGS. 5A and 5B, respectively.

Finally, as shown in FIGS. 6A and 6B, by machining process and polishing step, the air bearing surface 20 of the recording head and the reproducing head is formed, and thereby the thin film magnetic head is completed.

<Structure of Thin Film Magnetic Head>

Referring now to FIG. 10, the plane configuration of the thin film magnetic head according to the embodiment will be described.

FIG. 10 schematically shows the plane configuration of the thin film magnetic head manufactured by the method of manufacturing the thin film magnetic head according to the embodiment. Incidentally, in FIG. 10, the substrate 1, the insulating layer 2, the shield gap films 4 and 6 and the overcoat layer 14 are omitted. Furthermore, only part of the outermost region is shown with respect to the thin film coil 9. FIG. 6A corresponds to a cross section taken along line VIA-VIA in FIG. 10.

The position of the front end of the insulating layer 10 is the position which is a reference at the time of determining the throat height (TH), that is, the throat height zero position (TH0 position). The throat height (TH) is one of the factors which determine the performance of the recording head. The throat height is specified as a length from the position (TH0 position) of the front end of the insulating layer 10 to the air bearing surface 20.

The top pole 13 is, as described above, disposed on the write gap layer 12. For example, the top pole 13 includes the tip portion 13A having the extremely minute uniform width W1 for defining the recording track width and the yoke portion 13B, which is magnetically coupled to the tip portion 13A, for accommodating the magnetic flux generated by the thin film coil 9 in accordance with the order from the air bearing surface 20. The tip portion 13A, for example, has a rectangular shape in plane. The width of the yoke portion 13B is wider than the width W1 of the tip portion 13A. For example, the width of the yoke portion 13B is almost uniform in the rear part, and is gradually narrowed toward the air bearing surface 20 in the front part.

<Operation of Thin Film Magnetic Head>

Referring now to FIGS. 6A and 6B and FIG. 10, the operation of the thin film magnetic head will be described.

In the thin film magnetic head, when current is passed to the thin film coil 9 via the external circuit (not shown) at the time of recording information, magnetic flux is accordingly generated. The magnetic flux generated at this time is accommodated in the yoke portion 13B of the top pole 13, and afterward propagates from the yoke portion 13B to the tip portion 13A. The magnetic flux propagated to the tip portion 13A further reaches the front end part of the tip portion 13A on the air bearing surface 20 side. The magnetic flux reached the front end part of the tip portion 13A generates a signal magnetic flux for recording on the outside near the write gap layer 12. By the signal magnetic flux, the recording medium is partially magnetized so as to record information onto the recording medium.

On the other hand, at the time of reproducing information, a sense current is passed to the MR film 5. A resistance value of the MR film 5 changes in accordance with a reproducing signal magnetic field from the magnetic recording medium. By detecting the change in resistance on the basis of a change in the sense current, information recorded on the magnetic recording medium can be read out.

<Action and Effects of Embodiment>

Figures 12A, 12B:
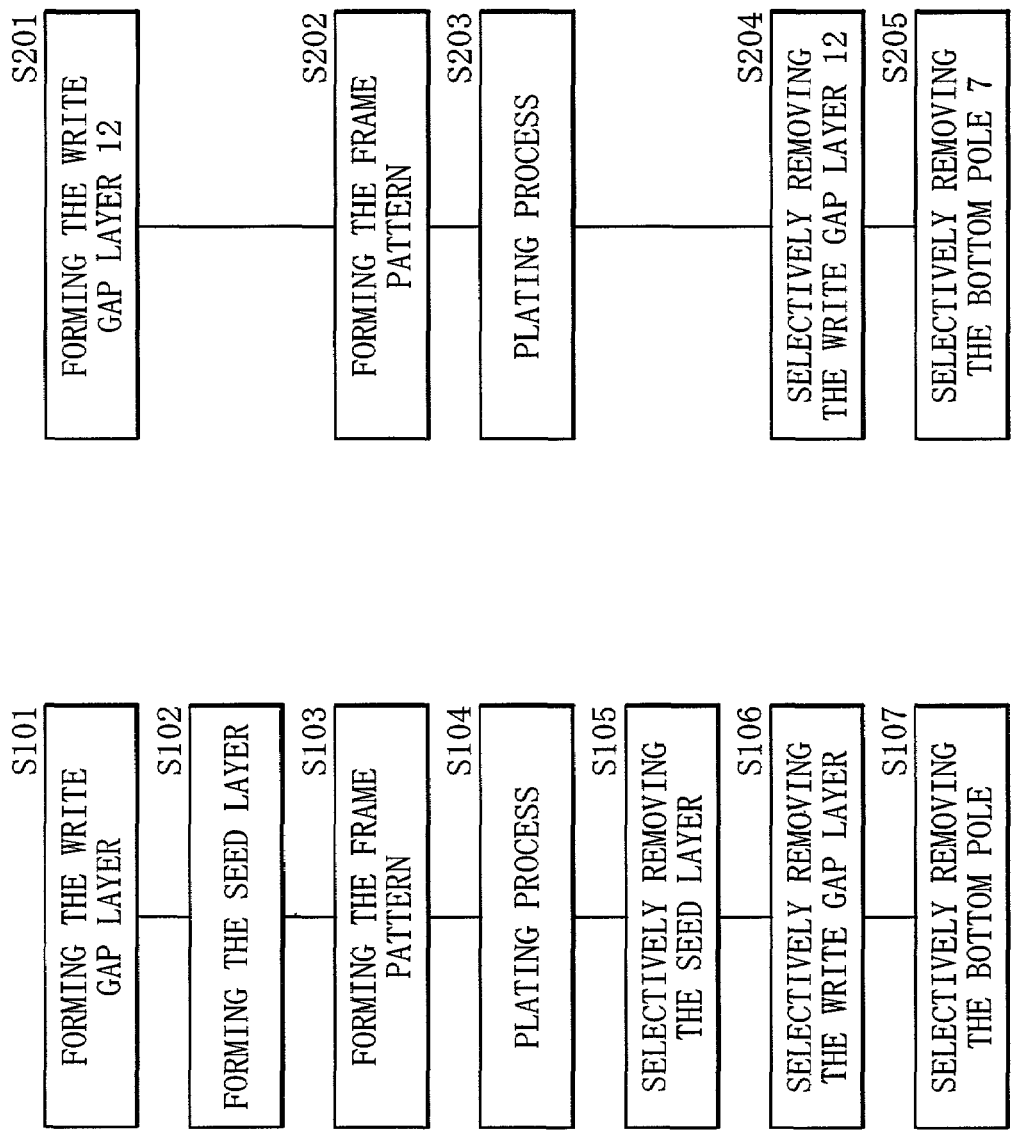
FIGS. 12A and 12B are flow charts for explaining main manufacturing processes that are necessary for manufacturing the thin film magnetic head.

Referring now to FIGS. 6A, 6B, 11A, 11B, 12A and 12B, action and effects of the embodiment will be described. FIGS. 11A and 11B show a cross-sectional structure of a conventional thin film magnetic head as a comparative example with respect to the thin film magnetic head according to the embodiment, corresponding to FIGS. 6A and 6B. FIGS. 12A and 12B are flow charts for explaining main manufacturing processes that are necessary for manufacturing a thin film magnetic head. FIG. 12A shows the flow chart with regard to the thin film magnetic head of the comparative example, and FIG. 12B shows the flow chart with regard to the thin film magnetic head of the embodiment, respectively. FIGS. 12A and 12B show the main manufacturing processes from forming a write gap layer to forming a trim structure. In the drawings, it is shown that processes linked by a broken line are in correspondence with each other. Incidentally, with regard to the thin film magnetic head shown in FIGS. 11A and 11B, the structure except points which will be described hereinbelow is similar to the structure of the thin film magnetic head shown in FIGS. 6A and 6B.

In the embodiment, after the write gap layer 12 is formed of a non-magnetic conductive material, using the write gap layer 12 as a seed layer, the top pole 13 is formed on the write gap layer 12 through plating process. The manufacturing time of the thin film magnetic head can be therefore shortened for reasons as follow.

More specifically, in the comparative example (FIGS. 11A and 11B), a write gap layer 22 is formed of a non-magnetic insulating material such as alumina or the like. In such a case, the top pole 13 cannot be formed directly on the write gap layer 22 by plating process, and therefore a process of newly forming a seed layer as an electrode film necessary for performing the plating process on the write gap layer 22 is necessary. Additionally, after forming the top pole 13 on the seed layer by plating process, a process of selectively removing unnecessary part of the newly formed seed layer except the part corresponding to the forming region of the top pole 13 by etching process is, furthermore, necessary. Therefore, the number of the manufacturing processes necessary in the comparative example is seven in total (refer to FIG. 12A). To be more specific, the processes are of "forming the write gap layer (S101)", "forming the seed layer (S102)", "forming the frame pattern (S103)", "plating process (forming the top pole; S104)", "selectively removing the seed layer (S105)", "selectively removing the write gap layer (S106)" and "selectively removing the bottom pole (forming the trim structure; S107)".

In contrast to this, in the embodiment (refer to FIGS. 6A and 6B), since the write gap layer 12 constructed of the non-magnetic conductive material also functions as the seed layer, the process of newly forming the seed layer and the process of selectively removing the newly formed seed layer, which are necessary in the comparative example, become unnecessary. Therefore, the manufacturing processes necessary in the embodiment are of "forming the write gap layer 12 (S201)", "forming the frame pattern (S202)", "plating process (forming the top pole 13; S203)", "selectively removing the write gap layer 12 (S204)" and "selectively removing the bottom pole 7 (forming the trim structure 100; S205)". That is, the number of the processes is five in total, and reduced by two from the number in the comparative example (refer to FIGS. 12A and 12B). Consequently, the manufacturing time of the thin film magnetic head is shortened as much as the reduced manufacturing processes. Moreover, in the embodiment, since the process of "selectively removing the write gap layer 12 (S204)" and the process of "selectively removing the bottom pole 7 (S205)" can be performed continuously as if they were one process, the manufacturing time is shortened in this point as well.

Figure 13A:
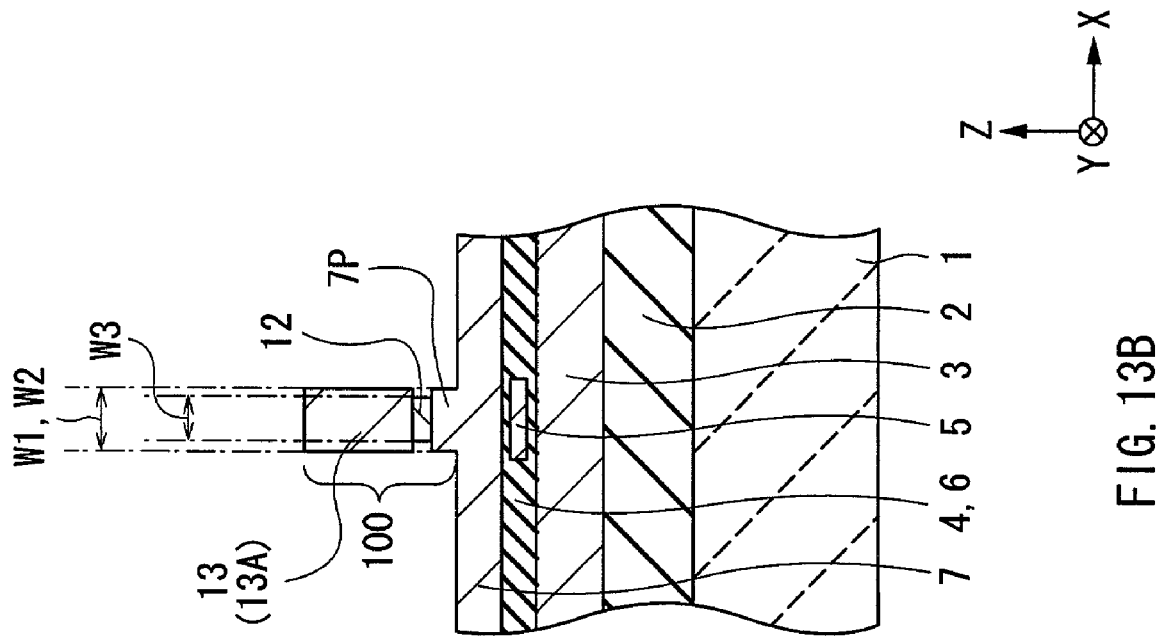
FIGS. 13A and 13B are diagrams for explaining the influence of the etching speed of the write gap layer in relation to the forming accuracy of the trim structure.
Figure 13B:
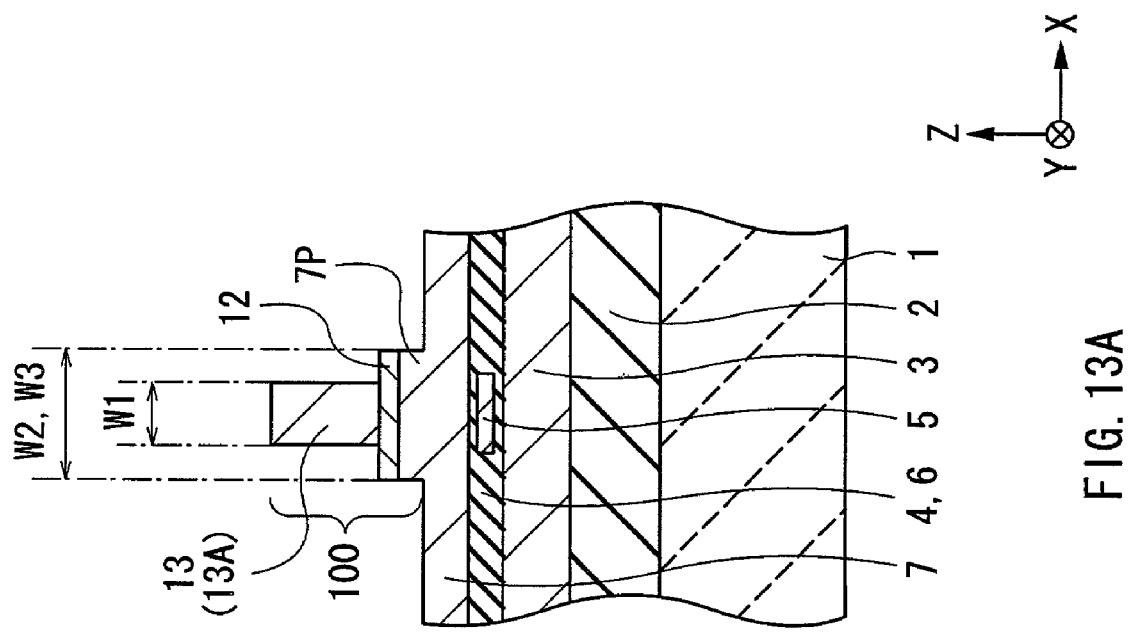

Furthermore, in the embodiment, as a result of forming the write gap layer 12 by using the non-magnetic conductive material, not only is the manufacturing time shortened as described above, but also the pole width can be extremely narrowed with high precision. In the following description, referring to FIGS. 13A and 13B, this point will be explained. FIGS. 13A and 13B are diagrams for explaining the influence of the ion milling speed E1 of the write gap layer 12 in relation to the forming accuracy of the trim structure 100, corresponding to FIG. 6B.

Generally, it is known that the etching speed by ion milling of the non-magnetic conductive materials such as copper that are listed as a forming material of the write gap layer 12 in the above-described "method of manufacturing the thin film magnetic head" is higher than that of the non-magnetic insulating material such as alumina. In the comparative example (refer to FIGS. 11A and 11B) of forming the write gap layer 12 by using the non-magnetic insulating material, when selectively etching the write gap layer 12 and the bottom pole 7 through ion milling by using the top pole 13 as a mask in order to form the trim structure 100, the ion milling speed E1 of the write gap layer 12 is low, and the etched amount is reduced. Consequently, the processed width W3 of the write gap layer 12 becomes wider than the width W1 of the tip portion 13A (W3>W1), and the processed width W2 of the portion 7P also becomes wider than the width W1 of the tip portion 13A (W2>W1). That is to say, it becomes difficult to extremely narrow the pole width with high precision (refer to FIG. 13A).

In contrast to this, in the embodiment of forming the write gap layer 12 by using the non-magnetic conductive material, the ion milling speed E1 of the write gap layer 12 is high, approaching the etching speed of the top pole 13 and the bottom pole 7. As a result, unlike the comparative example, as shown in FIG. 6B, both of the processed width W3 of the write gap layer 12 and the processed width W2 of the bottom pole 7 can be made to coincide with the width W1 of the tip portion 13A (W1=W2=W3), and thereby the pole width can be extremely narrowed with high precision.

This is evident from results shown in Table 1. Table 1 shows the experimental results on the processing accuracy of the pole width. The upper row shows those of the comparative example, and the lower row shows those of the embodiment, respectively. Here, an average pole width (μm), a standard deviation (μm) of the pole width and a difference (width difference=W2−W1; μm) between the processed width W1 of the tip portion 13A and the processed width W2 of the portion 7P are shown as experimental items.

TABLE 1

| average pole width (μm) | standard deviation (μm) | width difference (μm) |
|---|---|---|
| 0.325 | 0.031 | 0.05 |
| 0.316 | 0.017 | 0.01 |

As is evident from the results shown in Table 1, in the embodiment, a value smaller than that in the comparative example is obtained with respect to any of the experimental items. More specifically, judging from the average pole width being smaller, it has been shown that the pole width can be more extremely narrowed. Additionally, judging from the standard deviation of the pole width and the width difference being smaller, it has been shown that variation in the pole width is little, and that the trim structure 100 can be formed with higher precision. On investigation of the ion milling speed E1 of the write gap layer 12, in the comparative example, the ion milling speed E1 is half of the etching speed E2 of the bottom pole 7. In contrast to this, in the embodiment, the ion milling speed E1 is between nearly half (exclusive) and about two times of the etching speed E2. Particularly, it is more preferable that the ion milling speed E1 is almost equal to the etching speed E2.

Incidentally, when the ion milling speed E1 of the write gap layer 12 is higher than about two times of the etching speed E2 of the bottom pole 7, as shown in FIG. 13B, the write gap layer 12 is excessively etched. Consequently, the processed width W3 of the write gap layer 12 becomes excessively narrower than the width W1 of the tip portion 13A and the width W2 of the portion 7P. In such a case, the amount of the leakage flux generated between the tip portion 13A and the portion 7P increases, thereby causing a possibility of being short of the signal magnetic flux. Therefore, it is rather undesirable that the ion milling speed E1 is much too high. On the basis of the description up to this point, the ion milling speed E1 of the write gap layer 12 is preferably within the above-indicated range. Particularly, it is more preferable that the ion milling speed E1 is almost equal to the etching speed E2 of the bottom pole 7.

Furthermore, since the ion milling is used in the embodiment as a forming technique of the trim structure 100, the embodiment has an advantage from the viewpoint of making it easy to manufacture the thin film magnetic head. More specifically, as mentioned above, when the write gap layer 12 constructed of the non-magnetic insulating material is etched by ion milling, the ion milling speed E1 of the write gap layer 12 is low, therefore resulting in the prolonged manufacturing time. In this case, in order to make the ion milling speed E1 high for the purpose of shortening the manufacturing time, it is conceivable as means for processing the write gap layer 12 to utilize a physical and chemical etching action, for example, by using a reactive ion beam etching (RIBE) as an etching technique. However, in the case where the RIBE is used, since operations such as preparing an etching gas, setting an etching temperature and the like is necessary in order to ensure the chemical etching action, the etching process becomes complicated. Contrastively, since the ion milling utilized in the embodiment, unlike the RIBE, does not need the operations such as preparing the etching gas and the like, the etching process is simplified.

<Modifications of Embodiment>

Incidentally, although the write gap layer 12 is, as shown in FIG. 7, formed on the entire surface and the top pole 13 is formed by selectively performing the plating process with the frame pattern in the embodiment, the invention is not always limited to this. For example, the write gap layer 12 may be selectively formed only in a region where the top pole 13 will be formed.

Figures 14A, 14B:
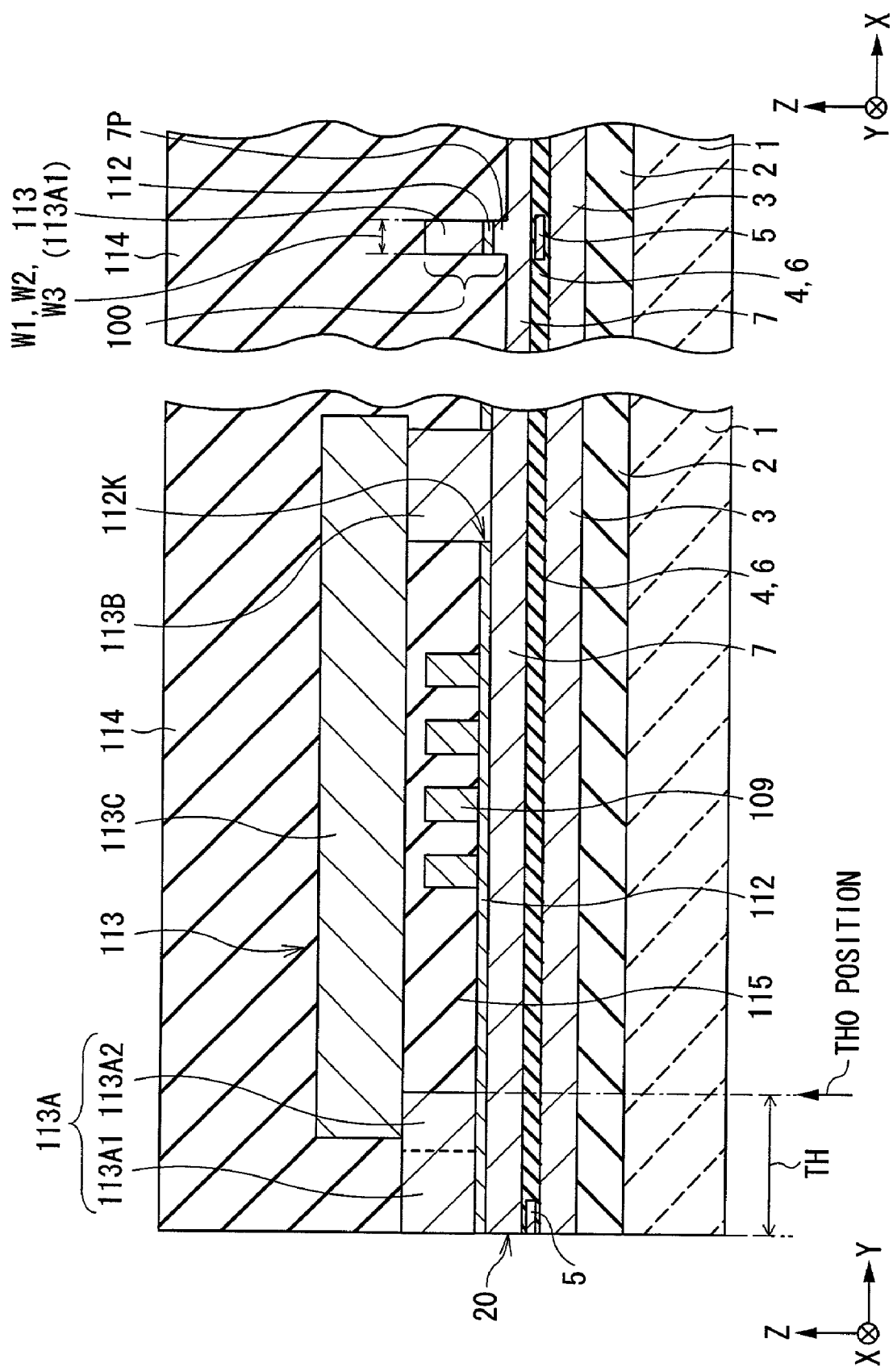
FIGS. 14A and 14B are cross sections showing a cross-sectional structure of a thin film magnetic head as a modification of the thin film magnetic head according to the embodiment of the invention.
Figure 15:
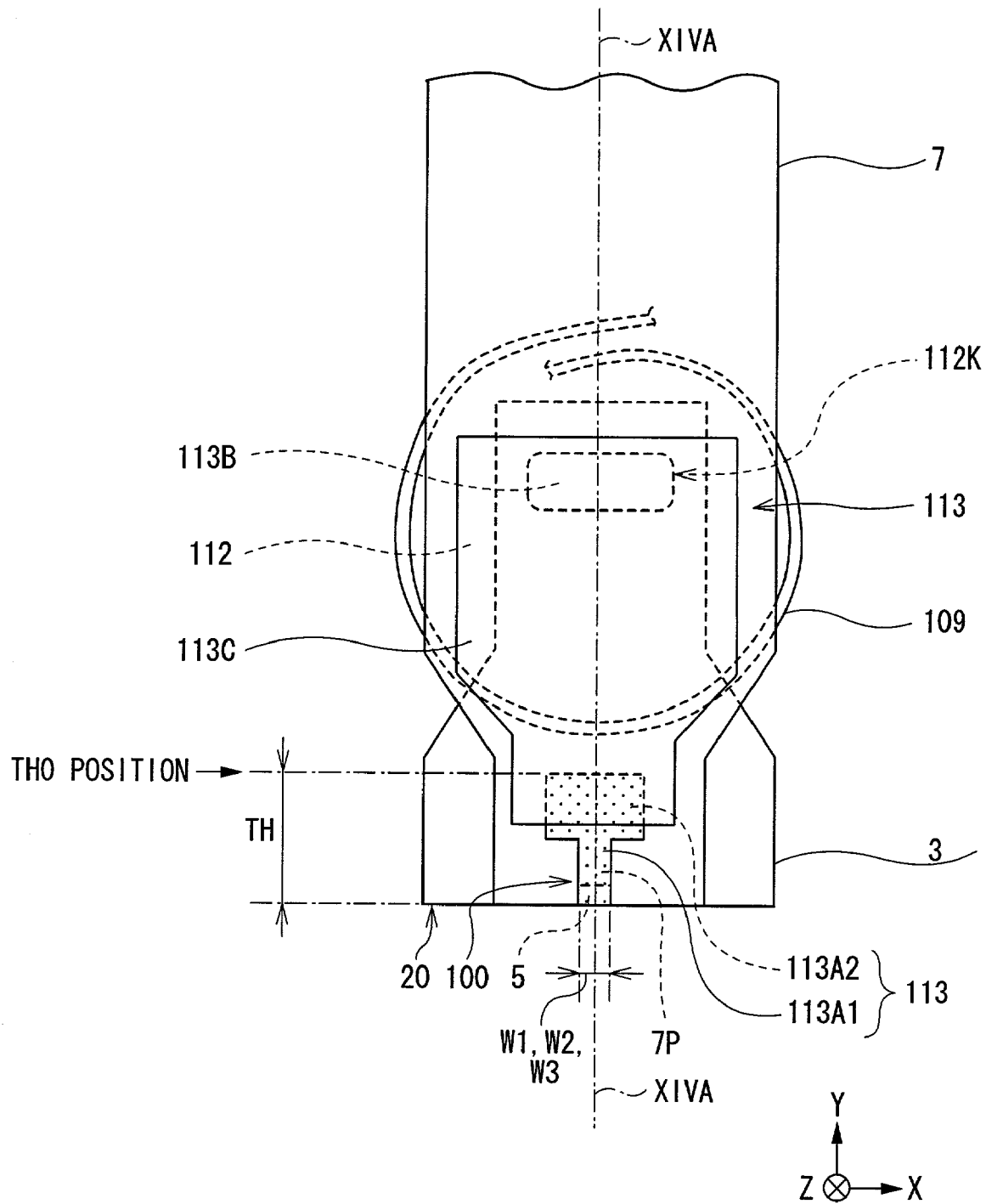
FIG. 15 is a plan view showing a plane structure of the thin film magnetic head shown in FIGS. 14A and 14B.

Furthermore, although the top pole 13 consisting of a single plating film is formed in the embodiment, the invention is not always limited to this. As shown in FIGS. 14A and 14B and FIG. 15, a top pole 113 consisting of a plurality of parts may be formed. FIG. 15 shows a plane structure of a thin film magnetic head as a modification of the embodiment. FIG. 14A shows a cross-sectional structure taken along line XIVA-XIVA shown in FIG. 15. FIGS. 14A and 14B and FIG. 15 correspond to FIGS. 6A and 6B and FIG. 10, respectively. In passing, except for points which will be explained on the thin film magnetic head in the following description, the construction, the forming material of each constituent, the forming method, the structural characteristics and the like are similar to those in the case of the above embodiment.

In the thin film magnetic head, for example, a write gap layer 112 is disposed on the bottom pole 7. The top pole 113 includes and is constructed of a top pole tip 113A disposed on the write gap layer 112, a connection portion 113B and a top yoke 113C overlapping with the top pole tip 113A and the connection portion 113B. The top pole 113 is magnetically coupled to the bottom pole 7 through an opening 112K. The top pole tip 113A includes a tip portion 113A1 having the uniform width W1 in correspondence with the tip portion 13A and a rear end portion 113A2 of a width wider than the width W1 of the tip portion 113A1. The top yoke 113C includes a front portion of a width wider than the width of the rear end portion 113A2 and a rear portion of a width still wider than the width of the front portion. The thin film coil 109 is embedded in a space surrounded by the write gap layer 112 and the top pole 113, and the space is filled with an insulating layer 115 made of alumina or the like. The front-end position of the insulating layer 115 corresponds to the TH0 position.

At the time of manufacturing the thin film magnetic head, for example, to begin with, the write gap layer 112 made of a non-magnetic conductive material is formed on the bottom pole 7. After that, the top pole tip 113A and the connection portion 113B is selectively formed through plating process by using the write gap layer 112 as a seed layer in a manner similar to the case where the top pole 13 is formed in the above embodiment. Subsequently, after the thin film coil 109 is formed on the write gap layer 112 in the space between the top pole tip 113A and the connection portion 113B, the alumina layer is formed so as to cover at least the space. Subsequently, after the entire surface is polished to be planarized by CMP (Chemical Mechanical Polishing) method or the like until at least both of the top pole tip 113A and the connection portion 113B are exposed, the top yoke 113C is formed on the planarized surface. In passing, as a forming method of the top yoke 113C, the plating process may be used as is the case with the top pole tip 113A and the like. And, moreover, other film-forming technique may be used.

In the thin film magnetic head of such construction or the method of manufacturing the same, effects similar to those in the case of the above embodiment can be also achieved. Here, the write gap layer 112 corresponds to an example of "gap layer" in the invention, the top pole 113 corresponds to an example of "first magnetic layer" in the invention, and the tip portion 113A1 corresponds to an example of "first pole tip portion" in the invention.

Although the invention has been described above by naming the embodiments, the invention is not limited to the above embodiments but can be variously modified. The details of the construction of the thin film magnetic head and the manufacturing method which have been described in the above embodiments are not necessarily limited to those described in the above embodiments, but can be freely changed as far as it can be attained to shorten the manufacturing time and to make the pole width extremely narrow with high precision by forming the write gap layer 12 with the non-magnetic conductive material.

Furthermore, for example, in the above embodiments, the case where the invention is applied to the composite thin film magnetic head has been described. However, the invention is not necessarily limited to this, but can be also applied to a recording-only thin film magnetic head having an inductive magnetic transducer for writing, a thin film magnetic head having an inductive magnetic transducer for recording and reproducing or a thin film magnetic head of a structure in which an element for writing and an element for reading are laminated in opposite order.

As described above, according to the thin film magnetic head or the method of manufacturing the thin film magnetic head of the invention, after forming the gap layer with the non-magnetic conductive material, at least the first pole tip portion is formed on the gap layer by growing the plating film with the gap layer used as an electrode. Consequently, the process of newly forming the electrode layer for the plating process and the process of selectively removing the newly formed electrode layer become unnecessary unlike the conventional case where the gap layer is formed by using the non-magnetic insulating material. Therefore, the manufacturing time of the thin film magnetic head can be shortened because the number of manufacturing processes is reduced.

Especially, according to the method of manufacturing the thin film magnetic head of one aspect of the invention, by using at least the first pole tip portion as a mask, the gap layer is selectively removed by ion milling, and subsequently the second magnetic layer is selectively etched to a predetermined depth. Consequently, the etching speed of the gap layer becomes higher than that of the case where the gap layer constructed of the non-magnetic insulating material is etched, thereby the manufacturing time of the thin film magnetic head can be therefore shortened. Better still, the pole width can be extremely narrowed with high precision because the etching amount of the gap layer is made appropriate.

Obviously many modifications and variations of the present invention are possible in the light of the above teachings. It is therefore to be understood that within the scope of the appended claims the invention may be practiced otherwise than as specifically described.

What is claimed is:

1. A thin film magnetic head comprising:
    first and second magnetic layers magnetically coupled to each other and having first and second pole tip portions placed so as to face a recording medium in conjunction with being in contact with a gap layer and being opposed to each other as sandwiching the gap layer, wherein the first and second magnetic layers have substantially the same thickness;
    a thin film coil disposed in a space between the first and second magnetic layers; and
    an insulating layer embedding the thin film coil in the space between the first and second magnetic layers, wherein:
    the first pole tip and the first magnetic layer are formed as a plated film on the gap layer; and
    the gap layer is constructed of a non-magnetic conductive material extends from the pole tip over the thin film coil.

2. A thin film magnetic head according to claim 1, wherein the gap layer is constructed of the non-magnetic conductive material on which an etching speed through ion milling is within a range extending from being higher than 0.5 times to being no more than 2 times of an etching speed on the second magnetic layer.

3. A thin film magnetic head according to claim 2, wherein the gap layer is constructed of one out of a group consisting of copper (Cu), chromium (Cr), tantalum (Ta), aluminum (Al), gold (Au), niobium (Nb), tungsten (W), ruthenium (Ru), molybdenum (Mo), beryllium (Be), nickel copper (NiCu), nickel chromium (NiCr), nickel phosphorus (NiP) and beryllium copper (BeCu), or an alloy including at least the one out of the group.

4. A thin film magnetic head according to claim 3, wherein the first magnetic layer including the first pole tip portion is constructed of the plating film as a single layer.

5. A thin film magnetic head according to claim 2, wherein the first magnetic layer including the first pole tip portion is constructed of the plating film as a single layer.

6. A thin magnetic head according to claim 1, wherein the gap layer is constructed of one out of a group consisting of copper (Cu), chromium (Cr), tantalum (Ta), aluminum (Al), gold (Au), niobium (Nb), tungsten (W), ruthenium (Ru), molybdenum (Mo), beryllium (Be), nickel copper (NiCu), nickel chromium (NiCr), nickel phosphorus (NiP) and beryllium copper (BeCu), or an alloy including at least the one out of the group.

7. A thin film magnetic head according to claim 6, wherein the first magnetic layer including the first pole tip portion is constructed of the plating film as a single layer.

8. A thin film magnetic head according to claim 1, wherein the first magnetic layer including the first pole tip portion is constructed of the plating film as a single layer.

9. A thin film magnetic head comprising:
    first and second magnetic layers magnetically coupled to each other and having first and second pole tip portions placed so as to face a recording medium in conjunction with being in contact with a gap layer and being opposed to each other as sandwiching the gap layer wherein the first and second pole tip portions have substantially the same thickness;
    a thin film coil disposed in a space between the first and second magnetic layers; and
    an insulating layer embedding the thin film coil in the space between the first and second magnetic layers, wherein:

the first pole tip and the first magnetic layer are formed as a plated film on the gap layer; and the gap layer is constructed of a non-magnetic conductive material extends from the pole tip over the thin film coil.

10. A thin film magnetic head according to claim 9, wherein the gap layer is constructed of the non-magnetic conductive material on which an etching speed through ion milling is within a range extending from being higher than 0.5 times to being no more than 2 times of an etching speed on the second magnetic layer.

11. A thin magnetic head according to claim 9, wherein the gap layer is constructed of one out of a group consisting of copper (Cu), chromium (Cr), tantalum (Ta), aluminum (Al), gold (Au), niobium (Nb), tungsten (W), ruthenium (Ru), molybdenum (Mo), beryllium (Be), nickel copper (NiCu), nickel chromium (NiCr), nickel phosphorus (NiP) and beryllium copper (BeCu), or an alloy including at least the one out of the group.

12. A thin film magnetic head according to claim 11, wherein the first magnetic layer including the first pole tip portion is constructed of the plating film as a single layer.

13. A thin film magnetic head according to claim 9, wherein the gap layer is constructed of one out of a group consisting of copper (Cu), chromium (Cr), tantalum (Ta), aluminum (Al), gold (Au), niobium (Nb), tungsten (W), ruthenium (Ru), molybdenum (Mo), beryllium (Be), nickel copper (NiCu), nickel chromium (NiCr), nickel phosphorus (NiP) and beryllium copper (BeCu), or an alloy including at least the one out of the group.

14. A thin film magnetic head according to claim 13, wherein the first magnetic layer including the first pole tip portion is constructed of the plating film as a single layer.

15. A thin film magnetic head according to claim 9, wherein the first magnetic layer including the first pole tip portion is constructed of the plating film as a single layer.

16. A thin film magnetic head according to claim 9, wherein the first magnetic layer including the first pole tip portion is constructed of the plating film as a single layer.

* * * * *